United States Patent [19]

Grethlein

[11] Patent Number: 4,997,665
[45] Date of Patent: Mar. 5, 1991

[54] DIETARY FIBERS AND A PROCESS FOR THEIR PRODUCTION

[75] Inventor: Hans Grethlein, Okemos, Mich.

[73] Assignee: Michigan Biotechnology Institute, East Lansing, Mich.

[21] Appl. No.: 417,377

[22] Filed: Oct. 5, 1989

[51] Int. Cl.$^5$ ................................................. A23L 1/10
[52] U.S. Cl. ..................................... 426/542; 426/543; 426/804
[58] Field of Search ................. 426/542, 543, 544, 804

[56] References Cited

U.S. PATENT DOCUMENTS

| | | | |
|---|---|---|---|
| 2,380,546 | 7/1946 | Patterson | 426/543 |
| 2,420,238 | 5/1947 | Gyorgy | 426/543 |
| 2,455,088 | 11/1948 | Patterson | 426/543 |
| 2,526,865 | 10/1950 | Gyorgy | 426/543 |
| 4,478,747 | 10/1984 | Crawford | 435/72 |
| 4,859,282 | 8/1989 | Chou | 426/804 |
| 4,927,654 | 5/1990 | Barnett | 426/804 |
| 4,948,619 | 8/1990 | Antrim | 426/542 |

FOREIGN PATENT DOCUMENTS 593516 5/1946 United Kingdom .
1570513 7/1980 United Kingdom .

OTHER PUBLICATIONS

Rasper, 1979, Chemical and Physical Properties of Dietary Ceral Fiber, Food Tech, Jan., pp. 40–44.
Floren, 1987, Binding of Bile Salts of Fibre-Enriched Wheat Fibre in Sypmosium on Dietary Fibre with Clinical Aspects, Sweden, pp. 192–199.
Story, 1987, Bile Salts—In Vitro Studies with Fibre Components in Symposium on Dietary Fibre with Clinical Aspects, pp. 174–180.
Hallberg, 1987, Wheat Fiber, Phytates and Iron Absorption in Symposium on Dietary Fibre with Clinical Aspects, Sweden, pp. 73–79.
Southgate, 1969, J Sci Food Agric. 20:331–335.
Eastwood, 1968, Biochem. Biophys. Acta. 52:165–173.
Irwin, 1944, J Biol Chem, 153:439–457.
Olcutt, 1958, J Am Oil Chem Soc, 35:161–162.
AACC Method Manual, 1983, Am. Assoc Cereal Chem, St. Paul, Minn.
Prosky, 1985, Dietary Fiber Methodology, In Dietary Fibre, Fibre-Depleted Foods and Diseases, H.-Trowell, D. Burkett, K. Headon (eds), Academic Press, London, pp. 57–75.

*Primary Examiner*—Carolyn Paden
*Attorney, Agent, or Firm*—Quarles & Brady

[57] ABSTRACT

Dietary fiber of enhanced functional properties and a novel antioxidant activity is prepared by mixing a slurry of a lignocellulose plant fiber while heating it and maintaiing it as a liquid until the functional properties of the fiber are enhanced and the fiber acquires an antioxidant property.

16 Claims, 2 Drawing Sheets

DIETARY FIBERS AND A PROCESS FOR THEIR PRODUCTION

FIELD OF THE INVENTION

The present invention generally relates to dietary fibers. More particularly, it relates to a process for preparing improved dietary fibers.

BACKGROUND OF THE INVENTION

The increased awareness of health benefits associated with dietary fiber has created a demand for dietary fiber supplements (DFS) for food items that is projected to equal 600 million pounds by 1992. This is a substantial increase from the current DFS use of 150 million pounds per year. Dietary fiber is generally considered to be that part of plant-like material which is resistant to mammalian digestive enzymes such as hemicellulose, cellulose, lignin, pectin, and other polysaccharides, such as gums, mucilages and b-glucans.

There are two basic classes of dietary fiber—soluble and insoluble. The insoluble fibers are used as supplements in bread, hamburger rolls, cookies, snack foods, pasta, pizza, etc., whereas the soluble fibers find application in liquid type food products, such as soft drinks, yogurt, salad dressings, spreads, ice cream, etc.

The functional role of dietary fiber supplements are many. These include health-related properties, such as bile acid adsorption, adsorption of toxins in the gut, low calorie bulking agents and water adsorption which cause rapid intestinal transport and increased fecal weight. The beneficial results of adding soluble and insoluble fiber to other food components are many; some of these include, adding bulk, mouth feel, moisture retention, emulsion stabilization, viscosity control.

While the scientific explanations of all the health impacts of dietary fiber consumption are yet to be developed, evidence of the beneficial effects of dietary fiber was reported by the Ad Hoc Expert Panel on Dietary Fiber in Physiological Effects and Health Consequences of Dietary Fiber, S.M. Pelch (ed.), Fed. Am, Soc. for Exp. Biology, Bethesda, MD, June(1987). It recommended that adults consume 20 to 35 g/day. However, since some dietary fibers, particularly those high in phytic acid, can also adsorb key minerals such as Ca or Zn, too much of such dietary fibers can lead to mineral deficiencies.

There are many sources of dietary fiber. It can be found in cereals, cereal brans, fruits, vegetables, and plant stems. There are many processes for the isolation of dietary fiber preparations from natural sources. The usual approach is to recover a dietary fiber from a seed hull or tuber by removing toxins, starches, oils, etc. or improving the mouth feel by some processing step. The fiber may be enriched by mechanical, chemical, or enzymatic means. Generally these processes do not add new functional properties to the fibers and it is necessary to rely upon other different fiber sources, sugar beet, wheat bran, pea hulls, soy hull, oat bran, etc. to get additional desired properties.

One of the simplest approaches for isolating dietary fiber is to simply form an aqueous slurry of the ground outer seedcoats of a legume, such as peas, to dissolve the protein and sugar and then to filter and t dry the insoluble fiber. The resulting product is suggested for use as a fiber enhancer in bread, muffins, or pasta.

In another process, dietary fiber is separated from vegetables, such as asparagus, by a series of steps involving boiling in water, washing with water, dewatering and drying. The product is suggested for use to adsorb mutagens.

In the process of Nonaka and Headly U.S. Pat. No. 4,757,948 a high total dietary fiber (over 80%) is obtained from corn fiber from a wet mill operation by a sequence of sifting the course fibers, roll milling and sifting again.

In a more involved process, a wheat bran dietary fiber is obtained by mixing a slurry of bran at pH 5.0 for 6 to 10 hours at 50° C. to 60° C. The natural phytase in the bran removes the phytic acid, which normally will adsorb metals. Then the protein and starch are removed by addition of protease and amylase enzymes; the enzymes are deactivated by heating the slurry to 95° C. to 100° C. for 1 hour. The fiber is washed, dewatered and dried. The product has more than 70% dietary fiber with less than 0.5 wt% phytic acid, negligible Fe, Ca or Zn adsorption, improved water swelling, water retention, and bile acid adsorption.

In the process of the Bommarito U.S. Pat. No. 4, 795, 633 sugar beet fibers are processed in a 5% acetic acid solution containing a bacteriacide and ascorbic acid as an antioxidant at 38° C. to 60° C. The dietary fiber containing pectin, cellulose, hemicellulose, lignin, protein and minerals is pressed and dried. This process removes natural toxins such as nitrates, oxalates, and saponins. The fiber is said to be effective in weight loss programs for obese people and treatment of irritable bowel syndrome.

In order to overcome the grittiness of cereal brans when incorporated in cereals, the Fulger U.S. Pat. No. 4, 759, 942 suggests grinding bran to 5 to 100 microns instead of the usual 150 to 840 microns improves mouth feel. The Chigurupati U.S. Pat. No. 4,735,814 overcomes the gritty mouth feel and mineral adsorption of dietary fiber by coating the bran with flour in a fluidized bed.

A dietary fiber product made from a fine suspension of wheat bran which is easily suspended by shaking in drinks and which is said to have an excellent mouth feel is made by the process of the Chavkin and Mackles U.S. Pat. No. 4,731,246. In the process 40-mesh bran is heated in water at pH 3.5 to 5.0 with 0.2% aluminum magnesium silicate for 20 to 60 mins at 80° to 100° C. and then cooled and subjected to sheering stress in a colloid mill.

An approach for enhancing the mouth feel of dietary fibers from any source is to coat them with soluble dietary fiber, such as alginates, gums, or pectin, which keeps the caloric value low for the treated fiber.

Other approaches include the process of the Fulger and Bradburg U.S. Pat. No. 4,500,558 which uses an extruder to heat treat the bran with its starch to coat the bran at 180° C., the extrudate is then milled to give an acceptable mouth feel and moisture retention. In the process of Kickle, et al U.S. Pat. No. 4,181,747 a 3 to 6% slurry of seed hull fiber at pH 2.5 to 5.0 (adjusted with $H_2SO_4$) is heated to 65° to 77° C. for 15 to 60 min. The fibers are dewatered, washed, dewatered, and dried. The heat treatment is said to pasturize the fiber and overcome the natural bacteria in the fiber. The product is suggested for use to enhance the fiber content in bread, pancakes, rolls, and cookies and contribute no more than 0.2 cal/g of fiber.

A common feature of the above described prior art procedures is that in each procedure, the dietary fiber was treated in some way to remove solubles, toxins, phytic acid, improve mouth feel, change color, or increase fiber content. The object of those prior art procedures was to improve an already known natural dietary fiber source in some way and to accept the result. In contrast, a significant modification of fiber is possible via the process disclosed in the J. M. Gould and L. E. Dexter U.S. Pat. No. 4,774,098 for making a dietary fiber from plant straw. In the patented process essentially all the lignin in the plant straw is removed leaving cellulose/hemicellulose as the dietary fiber. The process is based on an alkalinehydrogen peroxide treatment of the lignocellulose at pH 11.2 to 11.8 at ambient temperatures in which the material is delignified and the remaining cellulose and hemicellulose are made available to ruminants. When the lignin is removed, a white product, referred to as a modified plant fiber, is obtained which can be used as a non-caloric substitute for cereal flour. The process converts a waste agricultural lignocellulose from non-wood plants into a more desirable natural dietary fiber for incorporation in wide variety of foods, such as bread, cakes, cookies, etc.

Many foods to which dietary fiber might be added contain unsaturated fatty acids in a triglyceride molecule which are easily oxidized by $O_2$, so that the food can become rancid on standing even if the fat content is quite low such as 1 or 2%. The oxidized products are volatile aldehydes and ketones that impart the rancid taste and odor. The presence of metals such as Fe or Cu, act to accelerate the oxidation, whereas metal, chelators and chemical antioxidants can retard the oxidation. It would be advantageous if the dietary fiber being added possessed antioxidant activity.

In its simplest form the oxidation of fat or oil proceeds in a multiple step free radical chain reaction. The initiation step is the formation of a fatty acid radical when a proton departs on a-methylene carbon in the unsaturated fatty acid group of a fat molecule (RH). The resulting free radical

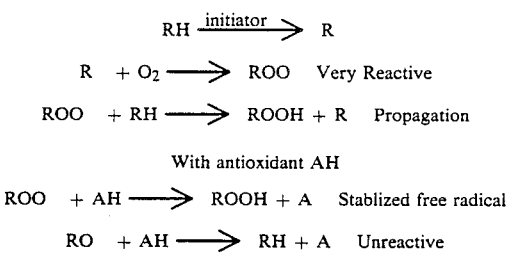

(R) easily reacts with molecular oxygen ($O_2$) to give an unstable peroxide radical (ROO) which in turn is very reactive with the fat molecules. The autocatalytic propagation of free radicals account for the sudden increase in oxidation. The details of the complete oxidation process are not understood but an antioxidant (AH) can inactivate or terminate the early propagation of free radical propagation with the effect of delaying the oxidative rancidity. The antioxidant, in effect, is sacrificed to terminate free radical propagation by becoming a very stable, unreactive free radical (A).

Well known and effective chemical antioxidants are hindered phenols such as butylated hydroxyanisole (BHA), butylated hydroxy toluene (BHT), tertiary-butylhydroquinone (TBHQ), and propyl gallate (PG). All these compounds form free radicals when they react with one of the propagating free radicals. Because of the number of mesomeric forms available for the free radical, the radical stability is increased with a corresponding decrease in reactivity. Thus, the antioxidant delays the oxidation of the substrate. The longer the delay the more effective is the antioxidant.

It is known that the use of lignin components from lignocellulose, such as Kraft lignins from paper pulp refining or acid precipitated lignin fraction from microbial degradation products of lignin, can have antioxidant properties in polymers and food.

It also is known that lignin derived components, such as the Kraft lignin from paper pulp refining, are made up of hindered phenols and are effective as antioxidants in rubber. There are other indications that lignin or its derivatives have antioxidant properties. For example, it has been reported that when 2.5 wt% Indulin AT, a lignin sulfonic acid derived from paper pulp delignification, is added to stripped corn oil, it gives the same antioxidant protection as 0.03 wt% and 6 tocopherol, a natural antioxidant. In contrast, 2.5 wt% addition of pure cellulose to stripped corn oil gives no antioxidant protection. It was recently reported that 0.5 wt% of the lignin isolated by enzymatic hydrolysis of the protein and cellulose from ground carrots can protect the methyl ester of sunflower oil from autoxidation.

An advanced approach to produce lignin derived antioxidants is disclosed in the Crawford and Pometto U.S. Pat. No. 4,478,747. In the patented process any natural occurring lignin from grasses, plants, or trees can be incubated up to 8 weeks with Streptomyces sp., which are known lignin degraders, to produce a water soluble acid precipitable polymeric degraded lignin (APPL) which has antioxidant properties in food, fuel oils, plastics, rubber, etc. Improved antioxidant properties of APPL are achieved by further chemical treatment. For example, the best APPL at 0.1 mg per gram of safflower oil gave 3 to 4.5 days of delay in autoxidation tests compared to 8 days for BHA and 2 days with no antioxidant.

In addition, in the Namiki et al. U.S. Pat. No. 4,649,206 a dilignol compound derived by treating crushed sesame seeds with b-glucosidase is reported to give antioxidant protection to pure linoleic acid.

Since some hindered phenolic compounds are antioxidants, it is reasonable to expect that the breakdown of native lignin, such as the lignocellulose present in many dietary fibers, could produce a host of hindered phenolic compounds such as ferulic, vanillic, syringic, a P-hydroxy benzoid acids, which might contribute antioxidant properties to the dietary fiber.

In the known prior art techniques of producing antioxidants from lignocellulose, the lignin has been removed as chemically modified fragments from the lignocellulose.

It would be advantageous to have a method by which lignocellulosic plant fiber, such as cereal bran, could be simply converted to a dietary fiber with enhanced functional and antioxidant properties.

BRIEF SUMMARY OF THE INVENTION

It is an object of the present invention to disclose a simple method of converting lignocellulose plant fiber into a dietary fiber which has enhanced functional and antioxidant properties.

It also is an object to disclose new improved dietary fibers having enhanced functional and antioxidant properties.

The method of the present invention basically comprises preparing an aqueous slurry, containing about 2% to about 25% by weight of a lignocellulosic plant fiber, mixing and heating the slurry while maintaining it as a liquid so that the fiber is hydrolyzed and the water binding capacity, the ability to absorb bile acids and other desirable functional properties of the fiber are enhanced and the fiber acquires a new antioxidant activity. The time, temperature and pH of the method can be varied to accomodate a batch reactor or a high temperature continuous reactor.

The novel dietary fiber produced by practice of the method of the present invention has enhanced water binding capacity, and enhanced ability to absorb bile acids and a novel antioxidant activity.

DESCRIPTION OF THE PREFERRED EMBODIMENT

Figure 1:
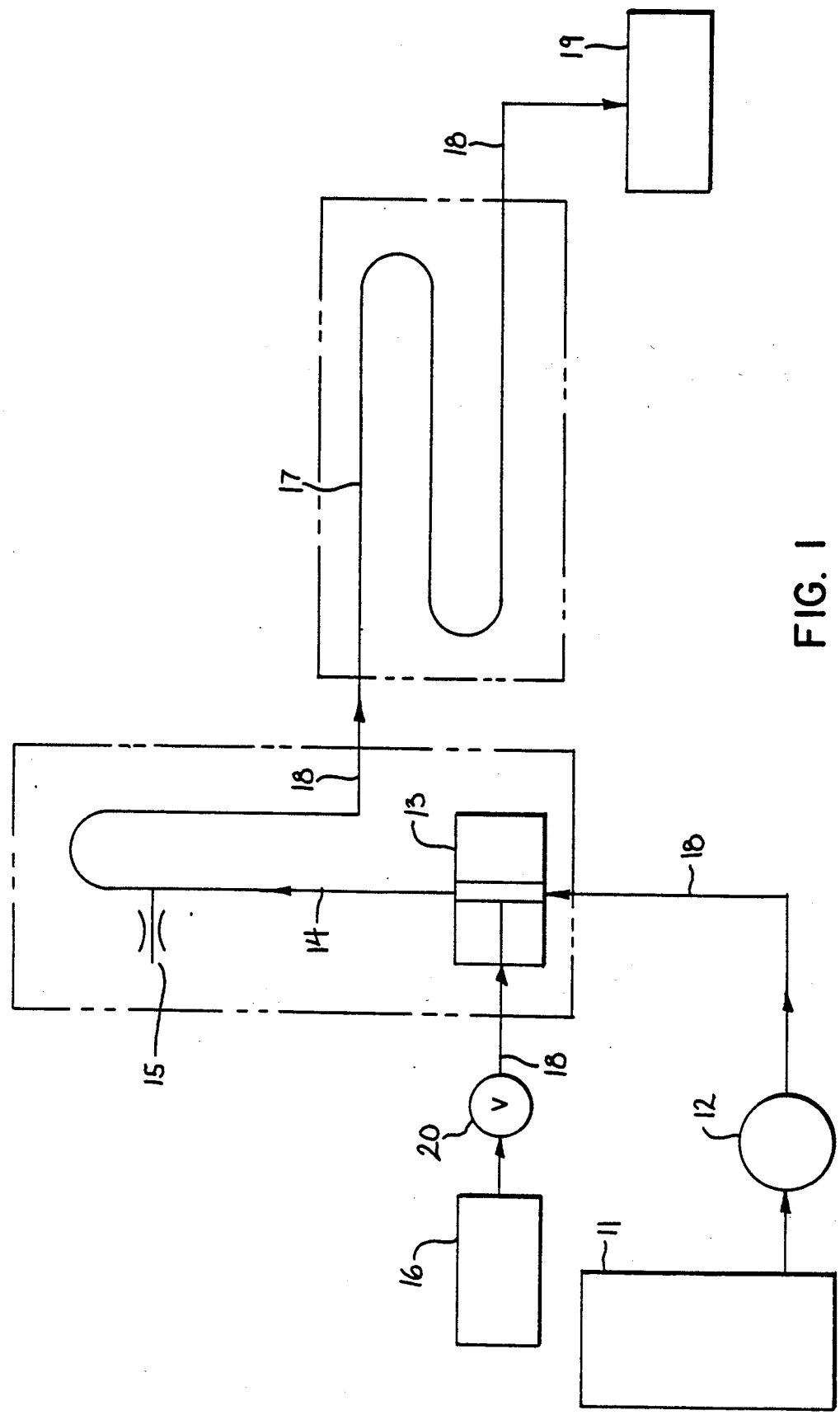
FIG. 1. Is a schematic illustration of a continuous high temperature flow reactor for use in the present invention.

In the preferred practice of the method of the present invention, an aqueous slurry containing about 5% to about 25% by weight of a lignocellulosic plant fiber is subjected to a novel acid hydrolysis. In the method, the pH of the slurry is adjusted to a pH of about 1 to about 5, preferably with an acid selected from lactic, propionic, phosphoric and sulfuric acid. The slurry is then mixed and heated in a high temperature continuous flow reactor at about 150° C. to about 300° C. while being maintained as a liquid by a pressure which is in excess of the vapor pressure of water at the reaction temperature e.g. a pressure of about 80 psi to about 1300 psi. The reaction temperature is maintained for about 5 seconds to about 90 seconds or until the dietary fiber has been partially hydrolyzed and has enhanced water binding capacity, an enhanced ability to adsorb bile acids and a novel and a useful antioxidant activity.

In another embodiment, the aqueous slurry, without added acid, is autohydrolyzed in the continuous high temperature flow reactor. However, the conversion takes longer than when the acid is added.

In still another embodiment of the process, the slurry is mixed with acid and heated at boiling for about ½ to about 10 hours, preferably at least 5 hours, to hydrolyze the fiber and to obtain a dietary fiber of enhanced functional properties which also has a novel and useful antioxidant activity.

The practice of the present invention is further illustrated by the experiments which follows:

EXPERIMENTAL

Materials and Methods

1. Materials.

In order to show that the method of the present invention is applicable to a number of lignocellulosic materials, a number of cereal brans and a wood flour were used. The list of materials, the approximate analyses, and the sources are given in Table 1.

TABLE 1

| Lignocellulosic Materials | | |
|---|---|---|
| Material | Approximate Analysis | Source |
| Corn Bran G311 | 90–92% total dietary fiber<br><6% starch<br><6% protein<br><2% fat<br><1% ash | Corn Products<br>6500 S. Archer Rd.<br>Summit-Argo IL 60501 |
| Red Wheat Bran | 12% fiber<br>15% protein<br>45% starch<br>6% ash<br>4% fat | DCA Food Ind. Inc.<br>101 East Bacon St.<br>Hillsdale MI 49242 |
| Oat Bran | 18% min total dietary fiber<br>12% min protein<br>7–9% fat<br>3% max ash | Spring Tree Corp.<br>P.O. Box 1160<br>Brattleboro VT 05301 |
| Stabilized Rice Bran (Protex) | NOT AVAILABLE | Riviana Foods, Inc.<br>1702 Taylors<br>Houston TX 77007 |
| Mixed Hardwood | 42% cellulose<br>24% hemocellulose<br>20% lignin<br>1% ash | Wilner Wood Products Co.<br>P.O. Box 193<br>Norway ME 04268 |

2. Conversion Procedure.

The conversion of each material is done in the same way by preparing a slurry of solids in water: 5 parts solids to 100 parts water. In order to wet the solids the slurry is mixed vigorously with a high shear mixer. When no solids remain floating on the surface of the water the mixing is stopped, because the solids then have been properly wetted and the entrapped air in the fiber has been displaced so that the solid particles sink to the bottom of the container. The mixed slurry is then ready for treatment. The conversion procedure can be done in either a batch reactor or a continuous high temperature flow reactor.

In an especially preferred embodiment, concentrated sulfuric acid is added to the slurry while mixing to give 1 part $H_2SO_4$ per 100 parts water (pH about 1) and the slurry is treated at about 180° C. while maintaining it as a liquid with pressure for about 7 seconds in a high temperature flow reactor.

The continuous high temperature flow reactor is schematically shown in FIG. 1. As seen in FIG. 1, the reactor 10 includes of a slurry feed tank/mixer 11, a moving cavity positive displacement pump 12, a mixing tee 13, a reactor tube 14, a discharge orifice 15, a source of high pressure steam 16, a condensor/cooler 17, connecting tubing 18 and a product collection vessel 19. The source of steam 16 preferably is an electrically operated steam boiler with a pressure controller. The hot parts of the system can be all well insulated to reduce heat loss.

Still referring to FIG. 1, a slurry of lignocellulosic material, prepared with or without acid or base and having a pH of 1 to 14, is put into the feed tank/mixer 11 and kept in suspension with the mixer. The feed tank/mixer 11 preferrably is on the top of the positive replacement pump 12. The slurry flows from the tank 11 by gravity to the pump 12 which forces the slurry to flow through the connecting tubing 18 to the mixing tee 13 and reactor tube 14. At the mixing tee 13 live steam from the steam source 16 is injected in to the slurry. The steam condenses to liquid and instantaneously heats the slurry to the desired conversion temperature. The temperature can be selected from 100° to 310° C. by selection of the proper boiler pressure. The exact temperature in the reactor is maintained by a temperature controller (not shown) which regulates the steam flow through a control valve 20. The reaction time is controlled by the flow rate through the reactor tube 14 by adjusting the variable speed drive on the pump 12 which adjusts the volumetric flow rate accordingly. The pump 12 moves the slurry through the reactor 10 and insures that the liquid contents do not vaporize at the high reaction temperature. Preferrably all the work is done at the same pump RPM (e.g. 38 rpm) which gives about seven seconds residence time for the slurry in the reactor tube 14. The slurry is heated by mixing directly with the high pressure live steam in the mixing tee 13. The steam condenses immediately and heats the slurry. The reaction is quenched by the adiabatic flash which occurs at the discharge orifice 15 in a fraction of a second. The pressure is instantly dropped to atmospheric pressure and so the slurry is flashed and cooled to about 100° C. This is sufficient to freeze the important chemical reactions that proceed at the much high temperatures in the reactor. The mixture of slurry and flash steam is condensed and cooled to room temperature in the condensor/cooler 17 which can be water cooled and collected in the collection vessel 19.

The desired reaction temperature is maintained by a process controller that manipulates the steam flow as needed. The steam boiler provides the steam at any selected pressure from 15 to 1650 psig. The instantly heated slurry is held in the tubular reactor 14 for the required reaction time. The pump RPM is adjusted to give the desired flow rate for a given reactor tube length. The reactor tube 14 is well insulated to insure an isothermal reaction.

The reactor 10 can be operated at steady state so that fixed reaction times and temperatures can be selected and reproduced. The pH of the slurry can be adjusted from 1 to 14 and can be controlled by adding an acid or a base to the slurry in the feed tank 11 or by introduction via chemical metering pumps (not shown).

The batch reactor used in the experiments is a 1 L round bottom glass flask (500 mL) equipped with a reflux condenser and electric heating mantle. About 500 mL of slurry (5% solids by weight) is placed in the reactor and heated to boiling (100° C.) and held for the desired time. While the time is varied from ½ to 10 hours, the most frequent time is 5 hours. The mixing caused by the boiling is sufficient to keep the solids in suspension. When the desired enhancement of function properties and creation of antioxidant properties is achieved, the flask and its contents can be cooled in tap water.

Once a lignocellulosic plant fiber has been treated in the described manner in either the described continuous flow reactor or the batch reactor, the recovery of the solids and the solubles follow a common procedure. The treated slurry is filtered or centrifuged to recover the converted or partially hydrolyzed product which generally contain dietary fiber polysaccharides and constituents that possess an antioxidant activity. The latter are believed to be lignin components, which may function as hindered phenolic compounds. The fiber solids are washed free of acid, if any, with deionized water to a pH between 6 to 7 dried to recover the residual free flowing solids which comprise the novel improved dietary fibers. The properties of the novel dietary fibers were evaluated by the procedures described below.

3. Dietary Fiber Assay Methods.

The term dietary fiber has been evolving and so have the methods for its analysis. It certainly includes the material previously referred to as "roughage" which is essentially the lignocellulosic parts of vegetables, fruit, and cereals. The current view is that the term dietary fiber is broader and includes all material that is essentially undigested in the mammalian gastrointestinal tract. In cereal brans, the major components are cellulose, hemicellulose, lignin and pectin. The crude fiber analysis using successive extractions with ether, acid and caustic was used up until the 1960s but this method lost some of the lignin and cellulose. Southgate developed a method to determine both the soluble and insoluble polysaccharides as hexoses, pentoses, and uronic acids; cellulose and lignin. The method, while time consuming, gives a good accounting of total dietary fiber (TDF). However, this complete chemical analysis of fiber does not correspond to the structural hinderance of fiber to digestion in the gastrointestinal tract. An enzyme-gravimetric method was finally adapted by AOAC in 1985 as the official method for food labeling. This method gives total dietary fiber (TDF) and includes soluble and insoluble components such as cellulose, hemicellulose, lignin, oligosaccharides, pectins, gums, and waxes and it is simpler than the Southgate method.

3.1 Bile Acid Adsorption

It is clear that in vitro assays for bile acid components are not the same as in vivo behavior of the gut. However, the described test is intended to show relative difference in dietary fiber preparations when comparing their ability for bile adsorption. The binding of bile acid in fiber was first been reported by Eastwood and Hamilton. One explanation of the hypocholesterolemic effect of certain dietary fibers is their ability to adsorb or sequester bile acids and other micellar components. This prevents their readsorption in the ileum and increases their fecal loss. There is some evidence that it is the lignin rather than the cellulose in the dietary fiber that most strongly binds bile acid.

The procedure is to measure the change of sodium cholate when a 10 ml solution at 10 mM is mixed with 1 g of dry dietary fiber for 1 hr. The concentration change is used to calculate the mg sodium cholate adsorbed per gram of dietary fiber. The solution concentration is determined by a photometric technique Irwin et al. In a similar way glycocholate and taurocholate bile salts adsorbtion can be determined.

3.2 Water Retention

The water-binding capacity of dietary fiber is important not only in the digestion aspects in determining fecal weight but also because of the functional properties it imparts to food such as bulk, moisture retention, viscosity, mouth feel, etc. The water-binding capacity of dietary fiber is determined by an operational procedure based on the method of AACC. In this method about 0.2 grams of dry matter are weighed accurately into a series of preweighed centrifuge tubes. Distilled water is added in incremental amounts to the various tubes. The samples are allowed to become freely wetted. The tubes are centrifuged at 2000×g for 10 min. The supernatant is discarded and the wet pellet is weighed. If no supernatant appears, the procedure is repeated with more water. The approximate water-binding capacity (WBC) is defined as the difference in wet weight of the decanted fiber and the dry weight divided by the dry weight. A refined WBC is determined making a series of tests with water increments of 0.5 ml near the approximate WBC value. The two tubes that bracket the case of no decant and decant water are used to compute the WBC as the average water bond per unit of dry weight. In this way the method does not remove the soluble components in the dietary fiber.

3.3 Antioxidant

Antioxidant activity is evaluated by a method based on the days delay in the weight gain by air oxidation of a refined soybean oil as described by Olcott et al. Soybean oil is purified by passage through a column packed with activated alumina and is stored under nitrogen. A set of dried acid cleaned glass breakers (30 ml) are loaded with the desired quantity of antioxidant and 1 g of refined soybean oil and placed in a 60° C. oven. Each day the beakers are removed from the oven, cooled in a dessicator, weighed on an analytical balance and then returned to the oven. The weight gain is plotted vs time in days and the test is over when the sample gain is equal to or more than 20 mg. The weight-time profile has the characteristic of no weight gain and then a sudden rise in weight reflecting the autocatalytic nature of lipid oxidation. The longer the delay in the rapid rise in weight, the better is the antioxidant. Initially three replicates are run for each case. Because the delay time is very reproduceable, two replicates were used in most tests.

EXAMPLE 1

The Production Of Dietary Fiber With A Novel Antioxidant Activity From Lignocellulosic Plant Fibers.

In order to show the effectiveness of the acid hydrolysis method of the invention in the treatment of plant fiber (corn bran-G 311), experiments were done in the flow reactor using 1% acid and 7 seconds over a range of temperatures while maintaining the slurry as a liquid with pressure when needed. For treatment in the range of temperatures of 220° C. to 308° C., the treated solids were found to impart a considerable delay in oxidation of the soybean oil as shown in the left half of Table 2. For example, there was an 18 day delay for a sample treated at 260° C., and a 20 day delay for a sample treated at 308° C. Both samples possessed superior antioxidant activity and exceeded the 13 days delay for BHA. In all but a very few cases, the weight gain of the replicate samples exceeded 20 mg on the same day and for most replicates are no more than one day apart. The improvement in the antioxidant properties of the treated corn bran or other cereal brans by the process of the present invention may be due to the gradual hydrolysis of hemicellulose and cellulose which leaves a solid richer in lignin or exposes the lignin or partially depolymerized lignin in the fiber matrix with its hindered phenolic type structure.

TABLE 2

Evaluation of Antioxidant Activity by Weight Gain of Corn Bran G311 Treated in a Flow Reactor Days delay before-weight gain of one gram soybean oil exceeds 20 mg by oxidation at 60° C.[3]. Results are the average for the number of replicates shown in parentheses.

| Temperature °C. of Acid Hydrolysis[1] | Solid 100 mg/g oil | Temperature °C. of Autohydrolysis[2] | Solid 100 mg/g oil |
|---|---|---|---|
| 220 | 3 (3) | 220 | 3 (3) |
| 240 | 7 (3) | 260 | 3 (3) |
| 260 | 18 (2) | 300 | 4 (2) |
| 270 | 9 (3) | 309 | 4.5 (2) |
| 290 | 6 (3) | | |
| 308 | 20 (2) | | |

[1] 1% H$_2$SO$_4$ and 7 sec in plug flow reactor
[2] No acid and 7 sec in plug flow reactor
[3] BHA at 0.5 mg/g oil gave 13 (2) days delay Although, the use of the high temperature flow reactor is preferred, there is an equivalence between the batch reactor and flow reactor, e.g. a long reaction time at 100° C. in the batch reactor is equivalent to a short reaction time (7 secs.) in the high temperature reactor. This is shown by treating corn bran (G311) in the batch reactor using 1% H$_2$SO$_4$ at 100° C. for a range of times from 30 min to 10 hr. The results are given in Table 3 where the oxidation delay for treated solids at 5 hours is seen to be 9 days and at 10 hours is seen to be 20.3 days. Together results of the flow reactor and batch reactor acid hydrolysis method with acid show that there are a wide range of time and temperature combinations that can be used to give an improved antioxidant activity to corn bran.

TABLE 3

Evaluation of Antioxidant Activity by Weight Gain Test of Corn Bran G311 by Treatment with Acid in a Batch Reactor Days delay before weight gain of one gram soybean oil exceeds 20 mg by oxidation at 60° C.[2]. Results are the average for the number of replicates shown in parentheses.

| Time, hours of Acid Hydrolysis[1] | Solid 100 mg/g oil |
|---|---|
| 0.5 | 3 (2) |
| 3 | 5 (2) |
| 5 | 9 (2) |
| 10 | 20.3 (3) |

[1] 1% H$_2$SO$_4$ and 100° C. in batch reactor
[2] BHA at 0.5 mg/g oil gave 13 (2) days delay The development of the antioxidant activity in corn bran by autohydrolysis (i.e., without the addition of acid) for 7 seconds in the flow reactor over a temperature range of 220° to 309° C. while maintaining the slurry liquid with pressure is shown in the right half of Table 2. There is a modest 4-day delay in oxidation for treatment at 300° C. and a 4.5-day delay for treatment at 309° C., respectively. Since the degree of hydrolysis is less without acid, auto hydrolysis below about 300° C. appears to give no enhanced antioxidant activity. In fact, batch treatment autohydrolysis at 100° C. regardless of time of treatment gave no enhanced antioxidant level.

As with corn bran, red wheat bran can develop antioxidant activity when treated by acid hydrolysis or autohydrolysis in the flow reactor. The results are given in Table 4 for treatment of a slurry with 1% H$_2$SO$_4$ for 7 seconds over a range of temperatures of 170° to 290° C. while maintaining the slurry as a liquid with pressure and for autohydrolysis for 7 seconds over a range of temperatures of 230° to 308° C. while maintaining the slurry as a liquid with pressure. The autohydrolysis is more effective for wheat bran than corn bran G311 as indicated by the 7-day delay for 290° C. autohydrolysis and 16-day delay for 308° C. autohydrolysis, respectively. The best results were obtained in the acid hydrolysis samples at 230°, 260° and 290° C. which give 51, 46 and 89-days delay, respectively.

It will be clear to one skilled in the art that the antioxidant activity can be optimized by manipulating the treatment variables in the process: pH, time, temperature, and slurry concentration.

TABLE 4

Evaluation of Antioxidant Activity by Weight Gain Test of Red Wheat Bran After Treatment in a High Temperature Flow Reactor
Days delay before weight gain of one gram soybean oil exceeds 20 mg by oxidation at 60°[3]. Results are the average for the number of replicates shown in parentheses.

| Temperature °C. of Acid Hydrolysis[1] | Solid 100 mg/g oil | Temperature °C. of Autohydrolysis Treatment[2] | Solid 100 mg/g oil |
|---|---|---|---|
| 170 | 5 (2) | 230 | 5 (2) |
| 200 | 18 (2) | 260 | 5 (2) |
| 230 | 51 (2) | 290 | 7 |
| 260 | 46 (2) | 308 | 16 (2) |
| 290 | 89 (2) | | |

[1]1% $H_2O$ and 7 sec in plug flow reactor
[2]No acid and 7 sec in plug flow reactor
[3]BHA at 0.5 mg/g oil gave 14 (2) days delay Finally, to show that the process of the present invention is applicable to other cereal brans and lignocellulosics, the antioxidant activities for rice bran, oat bran, and hardwood flour for a batch reactor acid treatment at 100° C. for 5 hr are shown in Table 5. Batch reactor acid treatment increases the oxidation delay to 5 days for both rice and oat bran from 3 days for the original materials. The results show that even a mixed hardwood flour can have enhanced antioxidant activity by the method of the present invention.

TABLE 5

Evaluation of Antioxidant Activity by Weight Gain Test of Raw and Acid Hydrolyzed Lignocellulosic Fibers and BHA
Days delay before weight gain of one gram soybean oil exceeds 20 mg by oxidation at 60° C. Dose 100 mg solid/g oil. Results are the average for the number of replicates shown in parentheses.

| Material | Days |
|---|---|
| BHA (0.5 mg/g) | 13 (2) |
| Rice Bran | 3 (2) |
| Treated Rice Bran[1] | 5 (2) |
| Oat Bran | 2.5 (2) |
| Treated Oat Bran[1] | 5 (2) |
| Mixed Hardwood | 2.5 (2) |
| Treated Mixed Hardwood[1] | 4 (2) |

[1]1% $H_2SO_4$ and 100° C. for 5 h in batch reactor

EXAMPLE 2

The Production Of Dietary Fiber With Enhanced Functional Fiber Properties Such As Bile Acid Adsorption And Water Binding Capacity.

To evaluate the enhanced functional properties, various cereal brans are treated as discussed above for antioxidant evaluation. The treated samples are filtered to recover the fiber and washed with distilled water to remove the acid, if present, and dried. The original dry cereal brans are also evaluated as controls.

Some selected bile acid adsorptions in the form of sodium cholate and sodium taurocholate are given in Table 6 for a number of cereal brans. An interesting observation is that the bran fiber has a significantly enhanced bile acid adsorption as the result of being mixed with 1% $H_2SO_4$ solution at room temperature in preparation for treatment. Generally, the adsorption level is increased by carrying out the treatment with acid at elevated temperatures in either the flow reactor or batch reactor.

TABLE 6

Selected Bile Acid Adsorption on Treated Brans

| Sample | Treatment Condition | mg Na Cholate Adsorbed/g Solid Average[1] | mg Na Taurocholate Adsorbed/g Solid Average[2] |
|---|---|---|---|
| Corn Bran G311 | None | 51.5 | |
| | Slurried in 1% $H_2SO_4$, at room Temp | 71.2 | |
| | 180° C., 1% $H_2SO_4$, 7 sec flow reactor | 95.7 | |
| | 100° C., 1% $H_2SO_4$, 5 hr batch | 91.9 | |
| Red Wheat Bran | None | 50.3 | 19.3 |
| | Slurried in 1% $H_2SO_4$, at room temp | 95.9 | 75.8 |
| | 170° C., 1% $H_2SO_4$, 7 sec flow reactor | 96.8 | 96.3 |
| | 100° C., 1% $H_2SO_4$, 5 hr batch | 97.0 | 74.5 |
| Oat Bran | None | 67.1 | 25.5 |
| | Slurried in 1% $H_2SO_4$, at room temp | 92.6 | 71.0 |
| | 100° C., 1% $H_2SO_4$, 5 hr batch | 94.9 | 67.5 |
| Rice Bran | None | 70.5 | 24.3 |
| | 100° C. 1% $H_2SO_4$, 5 hr batch | 100.0 | 82.1 |

[1]The 95% confidence limit on the average Na Cholate is ±3.2
[2]The 95% confidence limit on the average Na Taurocholate is ±3.7

The adsorption of sodium cholate on corn bran treated by the process with acid in the flow reactor for various temperatures or batch reactor for various times are shown in Table 7. Note that there is a maximum absorption with temperature or time.

TABLE 7

Effect of Acid Hydrolysis Temperature or Time on Sodium Cholate Adsorption and Water Binding Capacity for Corn Bran (G311)

| | mg Na Cholate Adsorbed per gram solid Average[1] | g Water Bound per gram solid Average[2] |
|---|---|---|
| Temperature in Flow Reactor Time 7 Sec. | | |
| 120° C. | 82.1 | 3.32 |
| 140° C. | 88.2 | 3.13 |
| 160° C. | 85.4 | 4.25 |
| 180° C. | 95.3 | 5.64 |
| 200° C. | 73.1 | 3.88 |
| Time in the Batch Reactor Temperature 100° C. | | |
| 3 h | 77.4 | |
| 5 h | 91.9 | |
| 8 h | 74.9 | |
| 10 h | 49.5 | |

[1]The 95% confidence limit on the average Na Cholate is ±3.2
[2]The 95% confidence limit on the average Water Bound is ±0.23

Figure 2:
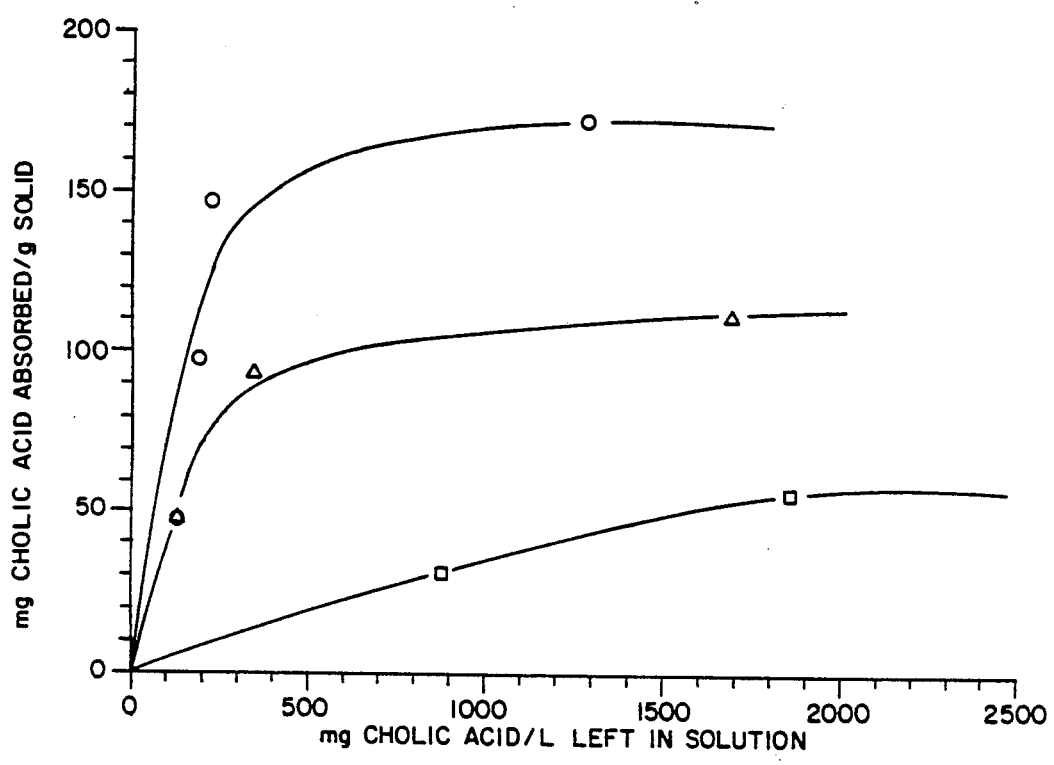
FIG. 2. Shows the adsorption isotherm of sodium cholate on raw corn bran and treated corn bran which has been slurried in 1% $H_2SO_4$ (W) and heated under pressure for about 7 seconds at 180° C.

All the bile acid adsorption results reported above start with 0.2 g of solid and 5.0 ml of 10 mM (4.08 g/L) Na cholate. However, the amount adsorbed is related to the concentration in solution, which is indicative of a simple Lagmuir adsorption isotherm. A comparison of the isotherms for corn bran, the corn bran treated with acid at 180° C. for 7 sec, and the acidified corn bran used to feed the reactor, are shown in FIG. 2. Here the ultimate capacity of the treated bran in the flow reactor for Na cholate is over 160 mg/g.

The water binding capacities for selected conditions for various cereal brans are shown in Table 8. The water binding capacities for corn bran and red wheat bran are about doubled by the treatment with acid of the fiber in the flow reactor or batch reactor. In the case of oat and rice bran, the improvement is more modest. As with the bile acid adsorption, the treatment conditions yield a maximum water binding capacity for the acid treatment in the flow reactor as shown in the last column of Table 7.

TABLE 8

Selected Water Binding Capacity of Treated Brans

| Sample | Treatment Conditions | g Water Bound/g Solid Average[1] |
|---|---|---|
| Corn Bran G311 | None | 2.64 |
| | Slurried in 1% acid at room temp | 2.94 |
| | 180° C. 1% $H_2SO_4$, 7 sec flow reactor | 5.64 |
| | 260° C., 7 sec, autohydrolysis, flow reactor | 5.15 |
| | 100° C., 1% $H_2SO_4$, 5 hr, batch | 4.04 |
| Red Wheat Bran | None | 2.87 |
| | Slurried in 1% acid at room temp | 2.72 |
| | 170° C., 1% $H_2SO_4$, 7 sec flow reactor | 4.57 |
| | 308° C., 7 sec autohydrolysis, flow reactor | 4.14 |
| | 100° C., 1% $H_2SO_4$, 5 hr batch | 5.32 |
| Oat Bran | None | 0.82 |
| | 100° C., 1% $H_2SO_4$, 5 hr batch | 2.15 |
| Rice Bran | None | 2.02 |
| | 100° C., 1% $H_2SO_4$, 5 hr batch | 2.78 |

[1]The 95% confidence limit on the average Water Bound is >0.23.

EXAMPLE 3

The Production of Functional Properties in Wheat Bran.

To illustrate the modified properties imparted to red wheat bran treated by lactic acid, phosphoric acid, and propionic acid as well as sodium hydoxide, data is given in Table 9 on the days delay in oxidation of soybean oil, water holding capacity and sodium cholate adsorption.

TABLE 9

Functional Properties of Red Wheat Bran after Batch Treatment of 5 h at 100° C. using Various Acids and Base

| Pretreatment Conditions | Antioxidant[1] days delay | Water Bound g $H_2O$/g Solid | Na Cholate Adsorption mg/g solid |
|---|---|---|---|
| none | 3 | 2.87 | 49.5 |
| 1% lactic acid | 5 | 5.48 | 96.7 |
| 1% phosphosic acid | 6 | 5.89 | 100.3 |
| 1% propionic acid | 3 | 4.94 | 84.9 |
| 1% NaOH | 2 | 6.27 | 10.6 |

1. 100mg bran/g. soybean oil.

The role of the acid or base as a catalysts is to control the pH of the hydrolysis and is not species dependent. It appears that the antioxidant property may require a strong acid for the hydrolysis, otherwise all the acids or base give enhanced water holding capacity and all the acids enhance the cholate adsorption. Thus the final choice should be dictated by the required compatibility, desired properties and taste effects of the dietary fiber.

The experimental results demonstrate that a variety of lignocellulosic plant fiber, such as cereal brans and even wood flour, can be modified by the method of the present invention to obtain dietary fibers with new functional properties or enhanced inherent functional properties.

The most unexpected new property obtained by subjecting plant fiber to the method of the present invention is the antioxidant activity. Although the exact mechanism by which the antioxidant property is created is not known, this property is thought to be due to modification of the lignin, which is present and could be a source of hindered phenolic compounds.

The other functional properties that have been enhanced simultaneously by the process of the present invention are bile acid adsorption, which is believed to help reduce serum cholesterol, and water binding capacity which adds bulk to dietary fiber, reduces transit time in the gastrointestinal tract, and contributes to satiety. Other functional properties, such as adsorption of toxins and rheological behavior, can also be improved and to add further utility to the dietary fiber.

Because the raw materials, such as cereal bran, are natural materials the developed or enhanced functional properties may be considered as "natural". This is particularly important where natural antioxidants are desired. Dietary fiber with one or more enhanced functional properties, including antioxidant activity, should find new uses in the expanding market for dietary fibers. The method of the present invention opens the possibility to use low grade cereal fibers and to add value to them by custom tailoring several function properties simultaneously to suit a particular food application by optimizing the process conditions.

It will be apparent to those skilled in the art that a wide variety of other sources of plant fiber, such as seed hulls, beet fibers, plant stalks or leaves, are possible raw materials for this process. As a result when one source of dietary fiber, such as oat bran, which has received a lot of public interest due to its cholesterol lowering ability, becomes scarce, the process of the present invention may be used to make it possible to produce a dietary fiber from corn or red wheat bran with equivalent functional properties.

The foregoing description of the present invention has been for purposes of illustration. It will be appreciated by those skilled in the art that a number of modifications and changes can be made without departing from the spirit and scope of the invention. For example, it is possible that an equivalent result might be obtained by reducing the temperature and conducting the reaction under reduced pressure for a longer time. Therefore, it is intended that such equivalents be covered by the claims.

I claim:

1. A process for enhancing the antioxidant activity, the bile acid absorbing capacity and the water binding capacity of a dietary fiber from a lignocelluluosic plant fiber which method comprises:
    (a) forming a slurry of ground plant fiber in water; and
    (b) treating the slurry by mixing and heating it in a continuous flow reactor at a reaction time in the range of about 5 seconds to 90 seconds and a temperature in the range of about 150° C. to about 300° C. while maintaining it as a liquid until the fiber acquires an enhances antioxidant property, an enhanced bile acid absorbing capacity or an enhanced water binding capacity.

2. A process of claim 1 in which the lignocellulosic plant fiber is selected from a cereal bran, such as corn bran, wheat bran, oat bran or rice bran, a seed hull, such as soy bean hull or oat hull, a sugar beet fiber, and plant stems, such as corn stover or wheat straw.

3. A dietary fiber prepared by the process of claim 1 which possesses enhanced antioxidant properties.

4. A process for enhancing the antioxidant activity, the bile acid absorbing capacity and the water binding capacity of a dietary fiber from a lignocellulosic plant fiber which method comprises:
  (a) forming a slurry of ground plant fiber in water; and
  (b) treating the slurry by mixing and heating it in a continuous flow reactor with the pH adjusted to about 0 to 3.0 by the addition of an acid, at a reaction time in the range of about 5 seconds to about 90 seconds and a temperature in the range of about 150° C. to about 300° C., with a pressure in excess of the vapor pressure of water for the reaction temperature to maintain it as a liquid until the fiber acquires an enhanced antioxidant activity, or an enhanced ability to absorb bile acid salts or an enhanced water binding capacity.

5. A process of claim 4 in which the pH is adjusted with sulfuric acid.

6. A process of claim 4 in which the pH is adjusted with phosphoric acid.

7. A process of claim 4 in which the pH is adjusted with lactic acid.

8. A process of claim 4 in which the pH is adjusted with propionic acid.

9. A dietary fiber prepared by the process of claim 4 which possesses enhanced antioxidant properties.

10. A process for enhancing the antioxidant activity, the bile acid absorbing capacity and the water binding capacity of a dietary fiber which method comprises:
  (a) forming a slurry of ground plant fiber in water; and
  (b) treating the slurry by mixing and heating it in a batch reactor with the pH adjusted to about 1.0 to 5.0 by the addition of an acid for a reaction time ranging from about ½ to about 10 hours at a temperature of about 100° C. until the fiber acquires an enhanced antioxidant property or ability to absorb bile acid salts or water binding capacity.

11. A process of claim 10 in which the pH is adjusted with sulfuric acid.

12. A process of claim 10 in which the pH is adjusted with phosphoric acid.

13. A process of claim 10 in which the pH is adjusted with lactic acid.

14. A process of claim 10 in which the pH is adjusted with propionic acid.

15. A dietary fiber prepared by the process of claim 10 which possesses enhanced antioxidant properties.

16. A process for enhancing the ability of a dietary fiber to absorb bile acid salts and to bind water which comprises:
  (a) forming a slurry of a ground plant fiber in water;
  (b) adjusting the pH of the slurry of about 0 to 3.0 with acid and mixing the slurry at room temperature for at least one minute; and
  (c) then removing the acid from the fiber by washing with water.

* * * * *